United States Patent [19]
Hargrove et al.

[11] Patent Number: 5,097,669
[45] Date of Patent: Mar. 24, 1992

[54] CONTROL OF HYDROGEN COOLER EMPLOYED IN POWER GENERATORS

[75] Inventors: Homer G. Hargrove, Maitland; Lon W. Montgomery, Winter Springs; James R. Pipkin, Orlando, all of Fla.

[73] Assignee: Westinghouse Electric Corp., Pittsburgh, Pa.

[21] Appl. No.: 653,575

[22] Filed: Feb. 11, 1991

[51] Int. Cl.$^5$ .............................. F25D 17/06
[52] U.S. Cl. .............................. 62/96; 62/185; 62/434; 62/505; 310/53; 310/55; 310/57
[58] Field of Search ............... 62/96, 185, 434, 505; 310/52, 53, 55, 57

[56] References Cited

U.S. PATENT DOCUMENTS

| | | | |
|---|---|---|---|
| 2,104,333 | 1/1938 | Rosenblad | 257/2 |
| 2,675,493 | 4/1954 | Grobel | 310/55 |
| 2,934,655 | 4/1960 | Heller et al. | 290/2 |
| 3,122,668 | 2/1964 | Cury | 310/53 |
| 3,214,153 | 10/1965 | Hauff et al. | 263/44 |
| 3,791,351 | 2/1974 | Kent | 122/479 D |
| 3,894,138 | 7/1975 | Klaar | 310/55 |
| 4,766,557 | 8/1988 | Twerdochlib | 310/53 |

FOREIGN PATENT DOCUMENTS 293132 12/1986 Japan.

Primary Examiner—Ronald C. Capossela

[57] ABSTRACT

A system for cooling hydrogen which is used for cooling an electric power generator, cooling of the hydrogen being effected by transfer of heat from hydrogen leaving the generator to cooling water extracted from a source which has a temperature determined by external conditions. The system is composed of an indirect heat exchanger for bringing cooling water into heat exchange communication with hydrogen leaving the generator and cooling water is supplied to the heat exchanger partially from the source and partially from cooling water leaving the heat exchanger. A temperature monitoring unit produces an indication of the temperature of the cooling water extracted from the source and a control unit is coupled to the temperature monitoring unit to cool the hydrogen to a desired temperature while maintaining a constant flow rate of cooling water into the heat exchanger.

10 Claims, 1 Drawing Sheet

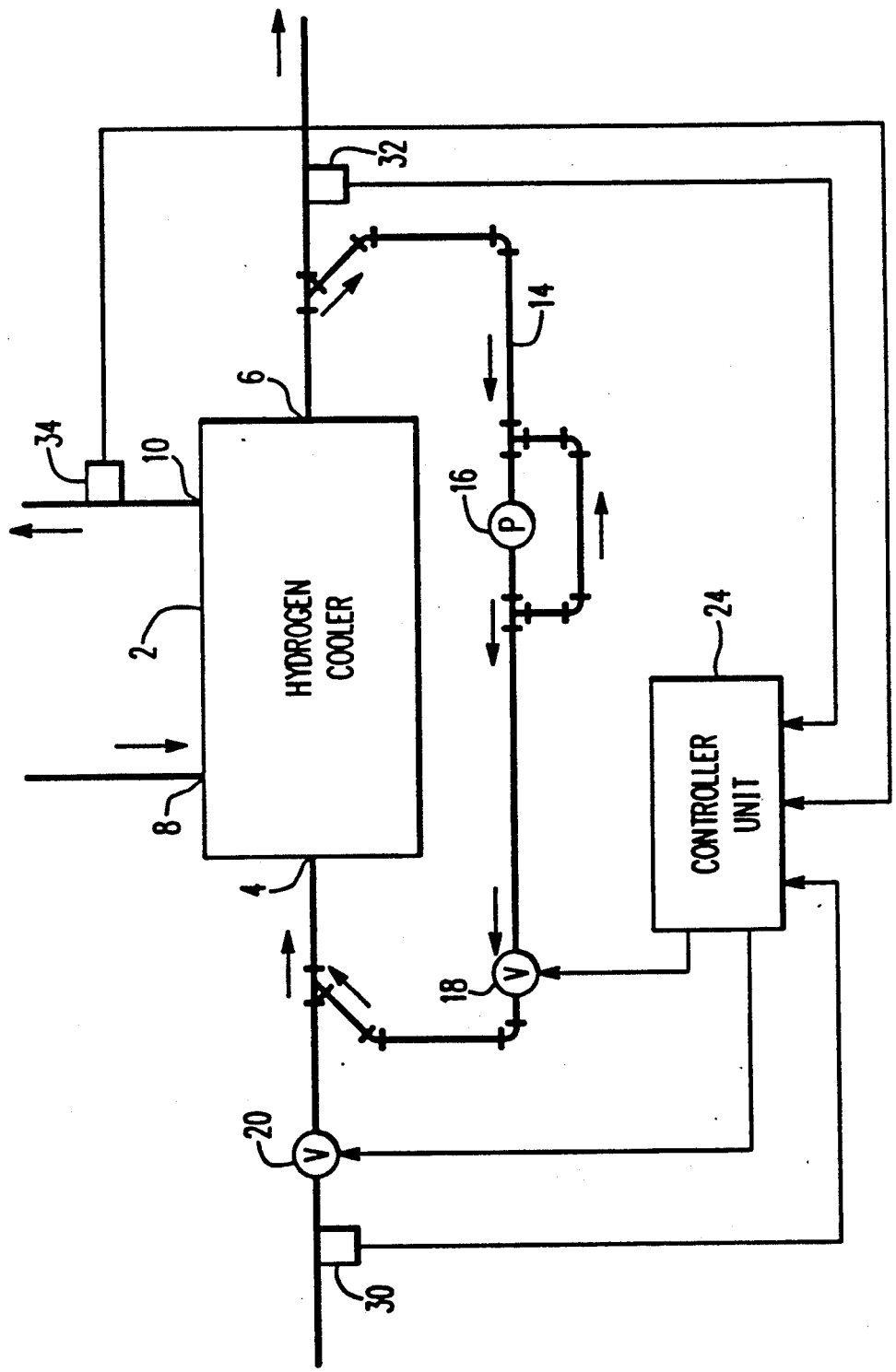

CONTROL OF HYDROGEN COOLER EMPLOYED IN POWER GENERATORS

BACKGROUND OF THE INVENTION

The present invention relates to control of the cooling of electrical power generators, particularly generators which are hydrogen cooled.

In view of the substantial levels of heat produced in electrical generators employed in power plants, they must be actively cooled, and it is common practice to utilize hydrogen for this purpose and to remove heat from the hydrogen in hydrogen coolers. Typical hydrogen coolers are cross-flow, extended-surface heat exchange units which transfer heat from hydrogen gas to cooling water by indirect heat exchange.

When this technique is used, the cooling water is usually extracted from a river, lake or cooling tower, so that the cooling water inlet temperature undergoes at least long term variations.

Whenever the cooling water inlet temperature varies, adjustments must be made to prevent corresponding variations in the hydrogen gas cooling. Overcooling of the circulating hydrogen gas would cause significant problems in other parts of the generator, such as diminished tolerances and increased moisture condensation. Undercooling, on the other hand, will result in overheating in other parts of the generator.

It is the current practice to compensate for changes in cooling water temperature by making an offsetting variation in cooling water flow rate. However, changes in the cooling water flow rate cause other problems.

For example, it is known that a thin sediment film normally coats the inside walls of cooling water tubes in such hydrogen coolers and when the cooling water flow rate is reduced, below approximately one meter per second, the thickness of this film increases and causes corrosion and pin holes which are the sources of leaks, as well as causing an increased fouling resistance which interrupts effective heat transfer.

If, on the other hand, the cooling water flow rate increases, for example above about three meters per second, the walls of the cooling water tubes, which are usually made of a copper alloy, are subject to erosion which results in pitting. In addition, increased flow rates cause undesirable pump power losses.

While many of the problems associated with changes in cooling water flow rate could be obviated by the use of stainless steel for the cooling water tubes, copper-bearing alloys are preferred for this purpose because of their superior heat transmission properties. Moreover, stainless steel is still subject to stress corrosion. Therefore, a change in tube material would not provide a complete solution to the problems caused by cooling water flow rate variations.

SUMMARY OF THE INVENTION

It is an object of the present invention to eliminate, or at least minimize, the problems created by changes in cooling water inlet temperature in hydrogen coolers.

Another object of the invention is to minimize cooling water flow rate variations while imparting the desired cooling to the hydrogen system.

The above and other objects are achieved, according to the present invention, by a system for cooling hydrogen which is used for cooling an electric power generator, cooling of the hydrogen being effected by transfer of heat from hydrogen leaving the generator to cooling water extracted from a source which has a temperature determined by external conditions, which system is composed of: an indirect heat exchanger for bringing cooling water into heat exchange communication with hydrogen leaving the generator; first water supply means connected to the heat exchanger for supplying thereto cooling water from the source; second water supply means connected to the heat exchanger for recycling thereto cooling water which has exited the heat exchanger; temperature monitoring means connected for producing an indication of the temperature of the cooling water extracted from the source; and control means coupled to the temperature monitoring means and the first and second water supply means for controlling the flow rate of water from the first and second water supply means in a manner to cool the hydrogen to a desired temperature while maintaining a constant flow rate of cooling water into the heat exchanger.

Thus, the present invention allows optimum heat exchange conditions to be maintained by effecting a controlled mixing of cooling water withdrawn from the primary source with heated cooling water in proportions controlled to maintain both the desired cooling water flow rate through the cooler and optimum cooling water entrance temperature needed to maintain the desired hydrogen temperature.

BRIEF DESCRIPTION OF THE DRAWING

The sole Figure is a schematic diagram illustrating a system for controlling the operation of a hydrogen cooler in accordance with the present invention.

DESCRIPTION OF THE PREFERRED EMBODIMENTS

The Figure illustrates, in block form, a hydrogen cooler 2 which is, in effect, a heat exchanger in which indirect heat exchange is effected between hydrogen gas and cooling water. Cooler 2 includes a cooling water inlet 4 connected to a primary source of cooling water, which may be a natural water body or a cooling tower. Cooler 2 further includes a cooling water outlet 6 for returning heated cooling water to its source. Hydrogen is conducted through cooler 2 from a hydrogen inlet 8 to a hydrogen outlet 10.

According to the present invention, a bypass flow path 14 is provided for returning a selected portion of the cooling water leaving cooler 2 to inlet 4 over a path which includes, in the illustrated embodiment, a pump 16 and at least one mixing control valve 18. In addition, a further mixing control valve 20 is provided in the inlet line to inlet 4 and the opening and closing of valves 18, 20 is controlled by signals supplied by a controller unit 24.

Controller unit 24 is, in turn, controlled primarily by temperature signals supplied by temperature sensor 30, disposed in the line to cooling water inlet 4. Controller unit 24 operates to adjust valves 18 and 20 in a coordinated manner such that the total cooling water flow rate through cooler 2 is maintained substantially constant while the temperature with which cooling water enters hydrogen cooler 2 is also maintained at a constant value.

The primary variable used to control operation of the system is the temperature of cooling water drawn from the primary source, as monitored by temperature sensor 30. If that temperature varies from a selected value, or a selected range, one of valves 18 and 20 will be opened and the other closed by coordinated amounts to vary the temperature of the cooling water entering cooler 2 in a manner to establish the desired hydrogen temperature at outlet path 10.

The opening and closing, respectively, of valves 18 and 20 need only be coordinated, in dependence on the delivery pressure in each cooling water line, to assure that a decrease in the mass flow rate through one path is substantially fully balanced by an increase in the mass flow rate through the other path. The extent to which the settings of valves 18 and 20 will vary in response to a deviation in the source temperature may take account of the cooling water exit temperature at outlet 6, for which purpose a temperature sensor 32 has its output connected to controller unit 24, and of the hydrogen temperature at outlet 10, where a temperature sensor 34 also has its output connected to controller 24.

If, as is usually the case, there is a constant heat load in cooler 2, a constant cooling water inlet temperature and flow rate will produce constant cooling water and hydrogen outlet temperatures. However, if the hydrogen outlet temperature should vary, controller unit 24 can act on valves 18 and 20 to produce a supplemental change in the cooling water temperature at inlet 4. If, on the other hand, the temperature at cooling water outlet 6 should vary, while the hydrogen temperature at outlet 10 has the desired value, controller 24 can act on valves 18 and 20 to maintain the cooling water temperature at inlet 4 at the desired value.

An effective control according to the invention can be achieved simply by varying the flow rates through valves 18 and 20 in response to an error signal proportioned to the deviation in the temperature of cooling water supplied by the source from the desired, or nominal, cooling water inlet temperature. This error signal could be used to alter the setting of both valves based on predetermined relations between valve setting and associated flow rate.

Controller unit 24 is not described in detail because it can be constructed according to principles well-known in the art, based on the considerations described above. If valves 18 and 20 are capable of being progressively opened and closed, or modulated, by electrical signals, controller unit 24 can be fabricated as an analog or digital function generator which is preprogrammed to derive valve control signals on the basis of the various temperature readings and in accordance with preselected equations.

The present invention offers the advantage of increasing the operating flexibility of a given hydrogen cooler design in that a given cooler system can be employed at locations having widely varying ambient cooling water temperatures.

The invention can be implemented by retrofitting existing plants which have exhibited cooling water temperature problems.

The present invention substantially reduces tubing corrosion and erosion associated with cooling water flow rate variations, and thus greatly increases the service life of such installations. Since the suppression of cooling water flow rate variations prevents heat transfer degradation which would result from increased fouling of the tubes, long term heat transfer efficiency is maintained.

The invention thus permits substantial economic benefits by increasing the useful life of hydrogen coolers, and thus eliminating one source of generator shutdown.

As will be understood, a system according to the present invention should be designed so that the highest cooling water source temperature which will occur during the course of a year can produce the required hydrogen cooling.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A system for cooling hydrogen which is used, in turn, for cooling an electric power generator, cooling of the hydrogen being effected by transfer of heat from hydrogen leaving the generator to cooling water extracted from a source which has a temperature determined by external conditions, said system comprising:
   an indirect heat exchanger for bringing cooling water into heat exchange communication with hydrogen leaving the generator;
   first water supply means connected to said heat exchanger for supplying thereto cooling water from the source;
   second water supply means connected to said heat exchanger for recycling thereto cooling water which has exited said heat exchanger;
   temperature monitoring means connected for producing an indication of the temperature of the cooling water extracted from the source; and
   control means coupled to said temperature monitoring means and said first and second water supply means for controlling the flow rate of water from said first and second water supply means in a manner to cool the hydrogen to a desired temperature while maintaining a constant flow rate of cooling water into said heat exchanger.

2. A system as defined in claim 1 wherein said control means comprise a first controllable valve disposed for controlling the flow rate of water supplied by said first water supply means, and a second controllable valve disposed for controlling the flow rate of water supplied by said second water supply means.

3. A system as defined in claim 2 wherein said control means are operative, when the hydrogen exiting said heat exchanger has a desired value, for controlling said valves in a manner to maintain the temperature of cooling water supplied to said heat exchanger at a constant value.

4. A system as defined in claim 3 wherein said temperature monitoring means are additionally connected for producing an indication of the temperature of cooling water leaving said heat exchanger.

5. A system as defined in claim 4 wherein said temperature monitoring means are additionally connected for producing an indication of the temperature of the hydrogen leaving said heat exchanger and said control means are operative for varying the temperature of cooling water supplied to said heat exchanger in response to variations of the temperature of the hydrogen leaving said heat exchanger from a desired value.

6. A system as defined in claim 2 wherein said temperature monitoring means are additionally connected for producing an indication of the temperature of cooling water leaving said heat exchanger.

7. A system as defined in claim 6 wherein said temperature monitoring means are additionally connected for producing an indication of the temperature of the hydrogen leaving said heat exchanger and said control means are operative for varying the temperature of cooling water supplied to said heat exchanger in response to variations of the temperature of the hydrogen leaving said heat exchanger from a desired value.

8. A system as defined in claim 2 wherein said temperature monitoring means are additionally connected for producing an indication of the temperature of the hydrogen leaving said heat exchanger and said control means are operative for varying the temperature of cooling water supplied to said heat exchanger in response to variations of the temperature of the hydrogen leaving said heat exchanger from a desired value.

9. A method for cooling hydrogen which is used for cooling an electric generator, said method comprising:
effecting heat exchange between hydrogen leaving the generator and cooling water in a heat exchanger having a cooling water inlet and outlet;
connecting the cooling water inlet of the heat exchanger to a source of cooling water;
monitoring the temperature of the cooling water in the source;
delivering to the cooling water inlet of the heat exchanger a mixture of cooling water from the source and cooling water leaving the heat exchanger outlet in a mixing ratio determined by the temperature of the cooling water in the source to maintain a substantially constant flow rate of cooling water into the cooling water inlet of the heat exchanger and a substantially constant temperature of hydrogen leaving the heat exchanger.

10. A method as defined in claim 9 wherein said step of mixing is carried out to maintain a constant temperature of cooling water at the cooling water inlet of the heat exchanger when the temperature of hydrogen leaving the heat exchanger has a desired value.

* * * * *